United States Patent [19]

Talbert

[11] Patent Number: 4,937,122

[45] Date of Patent: Jun. 26, 1990

[54] INSULATED CONSTRUCTION ELEMENT

[76] Inventor: William L. Talbert, 355 Folkstone Way, York, Pa. 17402

[21] Appl. No.: 329,852

[22] Filed: Mar. 28, 1989

[51] Int. Cl.$^5$ .............................................. B32B 3/26
[52] U.S. Cl. ........................................ 428/68; 428/71; 428/76; 428/120; 428/318.4
[58] Field of Search ............... 428/68, 71, 76, 106, 428/119, 120, 311.9, 318.4

[56] References Cited

U.S. PATENT DOCUMENTS

| | | | |
|---|---|---|---|
| 1,883,485 | 10/1932 | Beckwith | 428/306.6 |
| 3,145,504 | 9/1964 | Dunnington | 52/594 |
| 3,363,378 | 1/1968 | Palfey | 52/309.2 |
| 3,407,546 | 10/1968 | Yates et al. | 52/18 |
| 3,415,714 | 12/1968 | Hider | 428/317.5 |
| 3,712,004 | 1/1973 | Loebsack | 52/265 |
| 3,864,201 | 2/1975 | Susuki et al. | 428/106 |
| 3,959,050 | 5/1975 | Hooper, Jr. | 156/79 |
| 4,073,674 | 2/1978 | Hörtel | 428/318.4 |
| 4,119,750 | 10/1978 | Porter | 428/71 |
| 4,147,004 | 4/1979 | Day et al. | 52/309.9 |

FOREIGN PATENT DOCUMENTS 2253664 8/1973 Fed. Rep. of Germany ... 428/311.9

*Primary Examiner*—William J. Van Balen
*Attorney, Agent, or Firm*—Bacon & Thomas

[57] ABSTRACT

Insulated construction elements are made by bonding a pair of wood planks to an intermediate expanded foam layer to form a composite assembly which is thereafter divided longitudinally into a plurality of individual elements which may be utilized separately or in a prefabricated panel assembly for constructing the walls, floors and ceilings of a building.

4 Claims, 2 Drawing Sheets

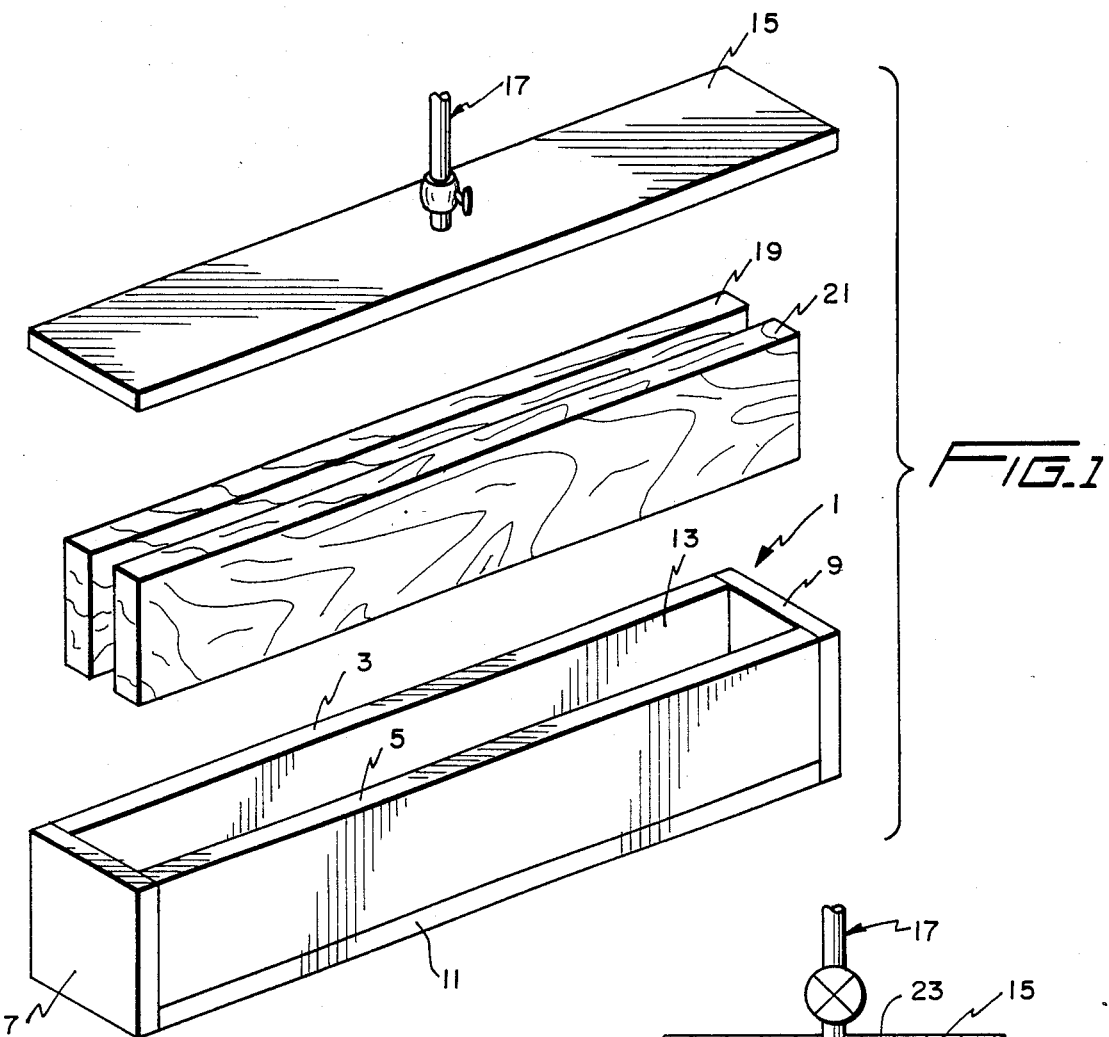
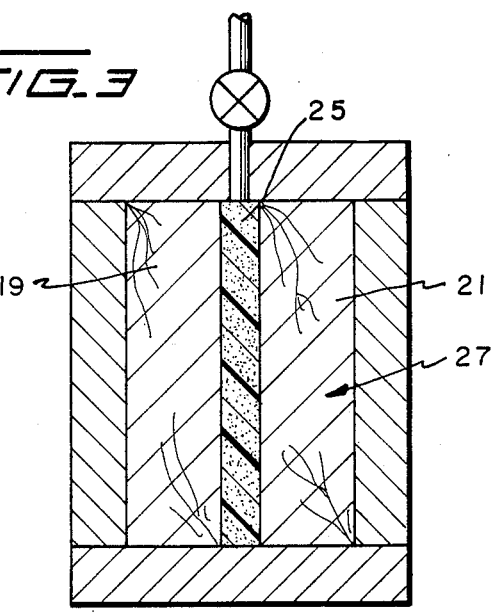
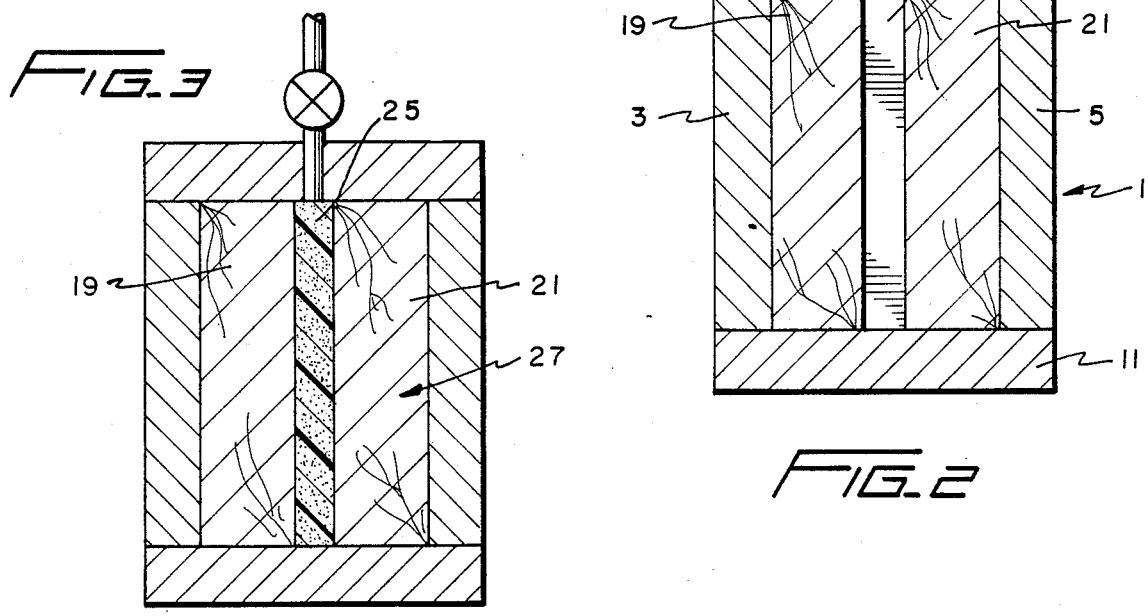

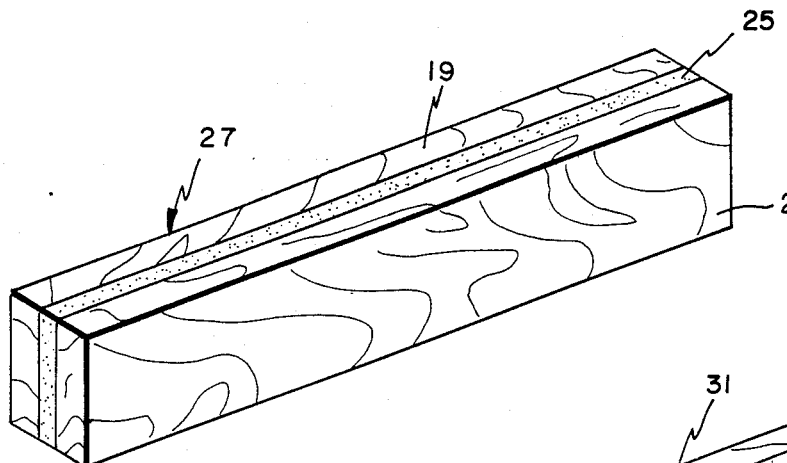
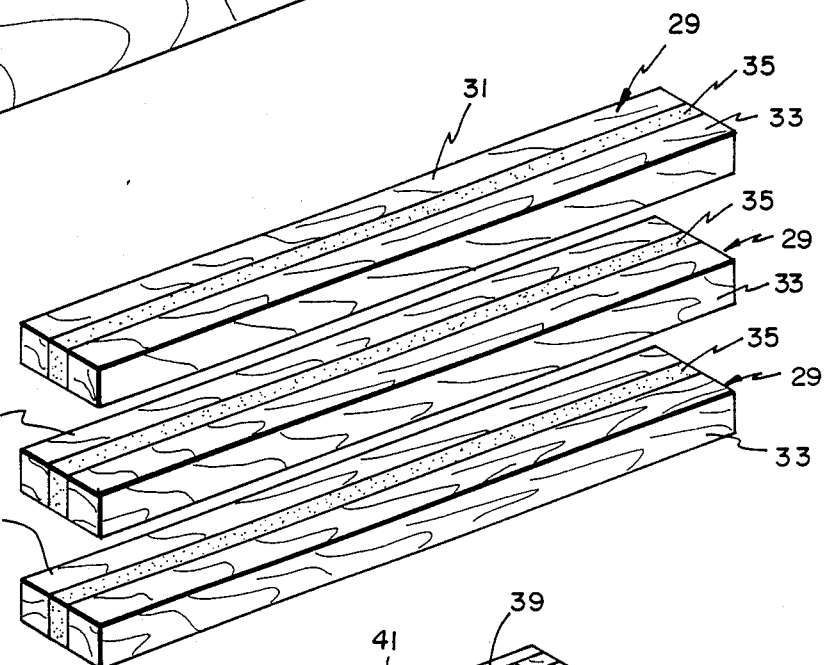
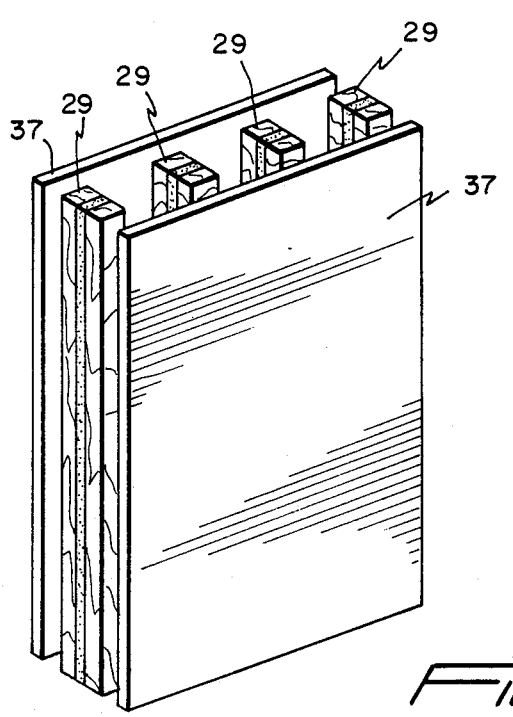
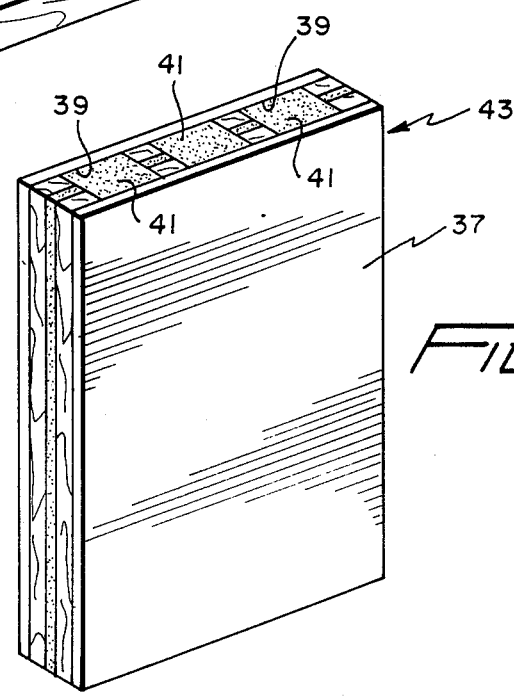

INSULATED CONSTRUCTION ELEMENT

BACKGROUND OF THE INVENTION

1. Field of the Invention

The present invention generally involves the field of technology pertaining to building construction systems. More specifically, the invention relates to an improved element for constructing insulating portions of a building.

2. Description of the Prior Art

It is conventional practice to construct the walls, floors and ceilings of a building by utilizing wooden members, such as two-by-four, two-by-six or two-by-eight lumber, for building a structurally integral framework onto which panels, such as gypsum wall boards or plywood sheets, are secured. The hollow spaces between adjacent panels on opposite sides of the members may be filled with appropriate material to provide thermal and acoustic insulation for the finished structure. Since the insulating of the wooden members and materials disposed in the hollow spaces are different, a wall, ceiling or floor constructed in this manner cannot provide uniform insulation against heat or sound transfer across the entire extent of the structure.

It is also known to construct the walls, floors and ceilings of a building by utilizing prefabricated panel assemblies formed from panel members secured to opposite sides of an insulating core member of foamed plastic. These assemblies are secured together along corresponding edges to form a rigid structural unit defining the rooms of a building.

SUMMARY OF THE INVENTION

It is an object of the present invention to provide an improved method of making a building element.

It is another object of the invention to provide an improved method by which building elements having thermal and acoustic insulating values may be easily and economically produced.

It is a further object of the invention to provide an improved prefabricated panel assembly having enhanced thermal and acoustic insulating values for constructing family dwellings or building structures.

These and other objects of the invention are realized by bonding a pair of wood planks to an intermediate layer of rigid plastic foam to form a composite assembly which is thereafter divided longitudinally into a plurality of separate building elements of predetermined dimensions. Each element comprises a laminate defined by two wood members bonded to opposite sides of a plastic foam core. The elements may be used separately as studs, base plates, partitions, headers or the like in building construction where both support strength and insulation values are desired. Plural elements may also be used to form prefabricated panel assemblies for constructing insulating walls, floors and ceilings in buildings.

Other objects, features and advantages of the invention shall become apparent from the following detailed description of preferred embodiments thereof, when taken in conjunction with the drawings wherein like reference characters refer to corresponding parts in the several views.

BRIEF DESCRIPTION OF THE DRAWINGS

FIG. 1 is an exploded perspective view depicting a mold box and a pair of wood planks for practicing the invention according to a preferred embodiment thereof.

FIG. 2 is a cross-sectional view showing the wood planks disposed in the mold box and spaced from each other to define a subcavity therebetween for receiving plastic foam material.

FIG. 3 is a cross-sectional view similar to that shown in FIG. 2, but with the subcavity filled with plastic foam material bonded to corresponding opposed faces of the wood planks to form a composite assembly.

FIG. 4 is a perspective view of the composite assembly shown in FIG. 3.

FIG. 5 is a perspective view of the composite assembly of FIG. 4 divided into a plurality of separate insulating building elements.

FIG. 6 is a perspective exploded view of a plurality of the building elements shown in FIG. 5 and a pair of rigid panels used in forming a prefabricated insulating wall panel assembly.

FIG. 7 is a completed wall panel assembly shown with insulation disposed within cavities defined by the building elements and rigid panels.

DETAILED DESCRIPTION OF THE PREFERRED EMBODIMENTS

The practice of a method according to a preferred embodiment of the invention shall be described with initial reference to FIG. 1. As shown therein, a mold assembly 1 is provided, with assembly 1 including a pair of side walls 3 and 5, a pair of end walls 7 and 9, and a bottom 11 collectively defining a rectangular-shaped mold cavity 13. Assembly 1 also includes a top 15 provided with a valved inlet 17 for admitting a moldable material into cavity 13.

A pair of substantially rectangular-shaped wood planks 19 and 21 are disposed within cavity 13 and spaced from each other to define a subcavity 23 therebetween, as shown in FIG. 2. Subcavity 23 communicates through valved fitting 17 with a source of moldable material. Mold assembly 1 is depicted in schematic form, and may be of any conventional mold or press apparatus known in the art and capable of being utilized in the practice of the invention as described herein. It is preferred that mold assembly 1 be substantially entirely formed of metal.

The moldable material directed through valved fitting 17 into subcavity 23 is preferably a foamable plastic polymer, such as polyurethane or polystyrene foam. A measured quantity of the foam is directed into subcavity 23 in liquid form and, under appropriate conditions known in the art, expands and fills the entire space of subcavity 23. For example, it is preferred that a foam be used which expands to approximately thirty times its liquid volume upon solidifying and which has a density of approximately six to twelve pounds per cubic foot, thus providing an expanding pressure of approximately ten pounds per square inch. The latter pressure shall be sufficient to cause planks 19 and 21 to tightly engage and conform to their corresponding portions of cavity 13 and thus result in the removal of any natural warp which may be present in planks 19 and 21. The foam material should further be selected so as to provide excellent thermal and acoustic insulating values.

Upon expansion and solidification of the foam material, there is provided a rigid expanded plastic intermediate foam layer 25 that is tightly bonded to corresponding faces of planks 19 and 21, as shown in FIG. 3. Planks 19 and 21, and foam layer 25 collectively define a rectangular-shaped composite assembly 27 which, when removed from mold assembly 1, is of the appearance shown in FIG. 4. As seen therein, assembly 27 is defined by a uniform laminate with foam layer 25 being permanently sandwiched between planks 19 and 21.

With reference to FIG. 5, composite assembly 27 is longitudinally divided, such as through cutting with a bandsaw or the like, into a plurality of separate building elements 29, with each element 29 being of an elongate rectangular-shaped configuration. It is preferred that the overall size of composite assembly 27 be such that the cutting of same in the manner described herein will produce elements 29 of uniform size for a given construction application. For example, element 29 may have a finished size equal to conventional lumber stock, such as two-by-three, two-by-four, two-by-six or the like. Each element 29 is in the form of a laminate defined by a pair of outer wood members 31 and 33 bonded to an intermediate form core 35. As is apparent, the length and width of foam core 35 corresponds to the length and width of foam layer 25 of composite assembly 27. The height of foam layer 25 is, of course, equally subdivided to define the individual heights of foam cores 35.

Due to the nature of the plastic foam forming core 35 and its secure bonding to members 31 and 33, each element 29 is of sufficient structural strength so as to be an equivalent substitute for its conventional solid wood counterpart in building construction. The overall strength of element 29 and the insulative values afforded by foam core 35 may be varied by utilizing wood planks 19 and 21 of different sizes in forming composite assembly 27. Thus, through the practice of this invention, elements 29 of desired acoustic and thermal insulative values, size and strength may be easily and economically produced.

As previously indicated herein, building elements 29 may be utilized separately in any conventional construction or building application. However, they may also be utilized in forming prefabricated insulated panel assemblies in a manner which shall now be described with reference to FIGS. 6 and 7. As shown therein, a plurality of elements 29 are arranged in a parallel and spaced disposition with cores 35 being disposed in linear alignment within a common plane. A pair of panels 37 are secured to opposed wood members 33 of each element 29 through any appropriate means known in the art, such as by adhesive bonding, mechanical fasteners or the like. Panels 37 may comprise gypsum drywall, masonite, plywood, metal or any other conventional building panel material known in the art. Panels 37 may be of the same or different materials, depending on the specific application of use. For example, one panel 37 may comprise gypsum drywall for presenting an interior wall surface, while the other panel 37 may comprise plywood for presenting an exterior wall surface. A plurality of resulting cavities 39 defined by elements 29 and inner surfaces of panels 37 are filled with appropriate insulation material 41, such as the same expanded plastic foam forming cores 35 or any other such material for realizing the desired insulative value. A completed panel assembly 43 formed in this manner may be of any standard construction size, such as four feet by eight feet or any other square or rectangular dimensions required.

It is important to note from FIG. 7 that thermal and acoustic transmission through panel assembly 43, i.e., from the exterior surface of one panel 37 to the exterior surface of the other panel 37 is effectively impeded because of the continuous insulation barrier across the entire intermediate portion of assembly 43, as defined by aligned cores 35 and insulation 41. This is especially important at those areas where elements 29 are located since cores 35 provide significantly enhanced insulative values when compared to utilizing elements 29 formed entirely of wood.

It is therefore apparent that the invention provides an extremely efficient and economical method of manufacturing insulating building elements 29 and prefabricated insulating panel assemblies 43. Elements 29 and panels 43 may be manufactured in virtually any required size for use in conventional construction applications in the building of dwelling and building structures. For example, panels 43 may be utilized in forming the exterior walls of a dwelling by attaching same to elements 29, the latter being sized accordingly to define the spaced vertical studs, top plate and bottom plate of a framework. The window and doorway openings of the dwelling may also be effectively constructed from elements 29 or preformed within panels 43 by constructing a header and surrounding frame for each opening from elements 29. The ceilings and floors of the dwelling may also be constructed in a similar manner with panel assemblies 43 and utilizing sufficiently large elements 29 as the floor and ceiling joists. Since foam cores 35 of elements 29, whether utilized separately or in assembly 43, are always in linear alignment, enhanced insulative values are substantially uniformly realized across the entire extent of the walls, ceilings and floors constructed in this manner.

Although building elements 29 and panel assemblies 43 have been disclosed as particularly useful in constructing dwellings and building structures, it is also apparent that they may be utilized for constructing other types of structures where enhanced insulative values are required, such as refrigeration units, storage bins and the like. Panel assemblies 43, when constructed with panels 37 of gypsum drywall on both sides, may effectively be utilized for constructing the interior walls of sound or recording rooms where a high degree of acoustic insulation is required.

It is understood that the forms of the invention herein shown and described are to be taken as preferred embodiments of the same, and that various changes therein may be resorted to by one of ordinary skill in the art without departing from the spirit of the invention or scope of the subjoined claims.

I claim:

1. An insulated panel assembly comprising:
    (a) a plurality of elongate elements, each element being defined by a laminate of two wood members bonded to an intermediate core of a first insulation material;
    (b) the elements being disposed in a spaced parallel array, with the intermediate cores thereof being in linear alignment;
    (c) a pair of panels secured to the wood members on opposite sides of the array, whereby the panels and elements define a plurality of cavities therebetween; and
    (d) a second insulation material disposed in the cavities.

2. The panel assembly of claim 1 wherein the first insulation material includes an expanded plastic foam.

3. The panel assembly of claim 2 wherein the plastic foam is selected from the group consisting of polyurethane, polystyrene and mixtures thereof.

4. The panel assembly of claim 1 wherein the first and second insulation materials are the same.

* * * * *